Feb. 14, 1928.

C. A. THOMAS 1,659,415

MEANS FOR HEATING GREASE FOR COOKERS

Filed May 18, 1926

INVENTOR,
Charles A. Thomas
BY Howard P. Smith
ATTORNEY.

Patented Feb. 14, 1928.

1,659,415

UNITED STATES PATENT OFFICE.

CHARLES A. THOMAS, OF OAKWOOD, NEAR DAYTON, OHIO.

MEANS FOR HEATING GREASE FOR COOKERS.

Application filed May 18, 1926. Serial No. 109,929.

This invention relates to new and useful improvements in means for heating grease for cookers.

It is the principal object of my invention to provide for cookers, means for heating the grease in which the material is cooked. While the invention relates to both hand-operated and automatic cookers, it applies more particularly to the automatic type of cooker providing a plurality of kettles in which the material to be cooked is progressively subjected to cooking action.

For the proper operation of these progressive automatic cookers, it is necessary that the grease in the last kettles be maintained at as high a temperature as in the first ones, and as a means for achieving this result I have provided the means hereinafter to be described for heating the grease required for the cooking operation in each kettle.

Other important and incidental objects will be brought out in the following specification and particularly set forth in the subjoined claims.

Figure 1:
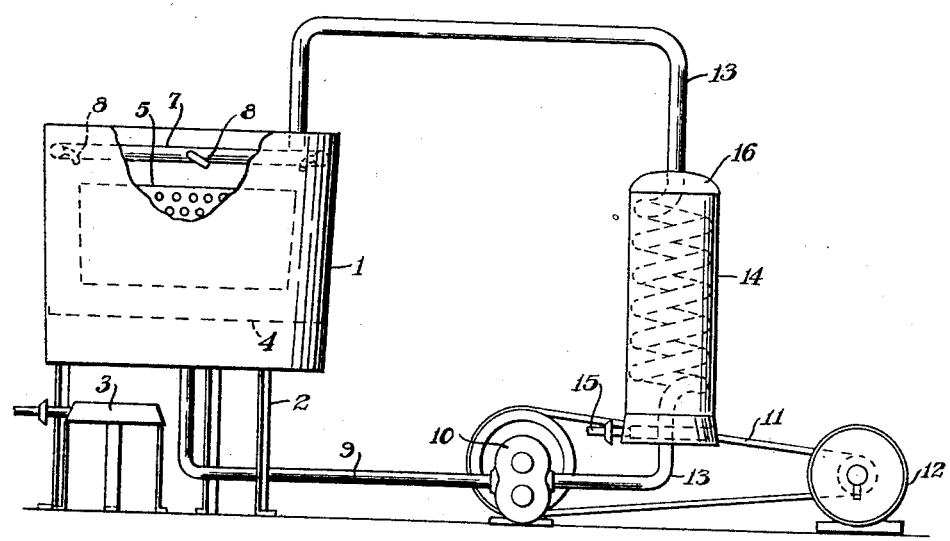
Figure 2:
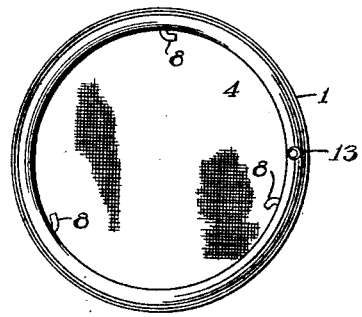

In the accompanying drawings illustrating my invention, Figure 1 is a side elevational view of a cooker partly broken away and to which my heating means have been applied. And Figure 2 is a top plan view of the cooker.

Referring to the accompanying drawings for a detailed description of the form of embodiment of my invention disclosed therein, the numeral 1 designates a cooking kettle which is mounted on a suitable stand 2 over a heater such as the gas burner 3. Horizontally secured in the bottom of the kettle 1 is a circular screen 4 above which there is adapted to be mounted in the kettle a wire basket or receptacle 5 to receive the material such as the potato chips to be cooked. (See Figure 1.)

Fitted in the top portion of the kettle 1 is an annular tube 7 from which there project tangentially nozzles 8 that are adapted to project grease such as lard into the kettle in such a manner as to violently agitate the chips, spinning them down through the grease and up again to thoroughly cook them.

For the purpose of heating the grease in the kettle 1 the following means are provided. Communicating with the bottom of said kettle is a pipe 9 which leads to a pump 10 operated through a belt 11 by a suitable motor 12. Also connected to the pump is a pipe 13 which is coiled through a vertical heater 14 under which there is a burner 15. The heater 14 is closed by a top cover 16 through which the tube 13 passes for connection to the annular tube 7 within the kettle 1.

The apertured basket 8 containing the chips or other material to be cooked is inserted in the hot grease within the kettle 1. This grease is uniformly maintained at the temperature required for the cooking operation by constantly withdrawing it from the kettle by the pump 10 and passing it through the pipe 13 which is coiled through the heater 14. After being heated in the latter, the hot grease is delivered to the annular tube 7 within the top portion of the kettle. From this pipe the hot grease is projected by the tangential nozzles 9 into the top of the kettle, sending the chips violently through the hot liquid in all directions to thoroughly cook them.

I do not wish to be limited to the details of construction and arrangement herein shown and described, and any changes or modifications may be made therein within the scope of the subjoined claims.

Having described my invention, I claim:

1. In a cooker, a receptacle containing a heated cooking liquid and articles to be cooked thereby, and means for causing said articles to move down and about freely in the liquid.

2. In a cooker, a receptacle containing a heated cooking liquid and articles to be cooked thereby, and means for causing said articles to move down freely and have a free circular motion in the liquid.

3. In a cooker, a receptacle containing a heated cooking liquid and articles to be cooked thereby, and nozzles arranged around the upper, inner edge portion of said receptacle to project a heated liquid against said articles to force them freely down and about in said liquid.

In witness whereof I have hereunto set my hand this 5th day of May, 1926.

CHARLES A. THOMAS.